United States Patent
Vrla

(10) Patent No.: US 12,379,047 B2
(45) Date of Patent: Aug. 5, 2025

(54) VALVE POSITION SENSOR

(71) Applicant: FMC Technologies, Inc., Houston, TX (US)

(72) Inventor: Chad Vrla, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 166 days.

(21) Appl. No.: 17/819,751

(22) Filed: Aug. 15, 2022

(65) Prior Publication Data

US 2024/0052947 A1 Feb. 15, 2024

(51) Int. Cl.
*F16K 37/00* (2006.01)
(52) U.S. Cl.
CPC .................. *F16K 37/0041* (2013.01)
(58) Field of Classification Search
None
See application file for complete search history.

(56) References Cited

U.S. PATENT DOCUMENTS

| | | | | |
|---|---|---|---|---|
| 5,407,172 A * | 4/1995 | Young | ................ | E21B 34/16 137/554 |
| 5,863,079 A * | 1/1999 | Donais | ................ | F16L 35/00 285/379 |
| 6,213,147 B1 * | 4/2001 | Gramann | ................ | F01L 9/20 123/90.11 |
| 2008/0197306 A1 * | 8/2008 | Judge | ................ | E21B 33/062 251/1.3 |
| 2015/0219242 A1 * | 8/2015 | Almazan | ............. | F16K 37/0041 137/554 |

* cited by examiner

*Primary Examiner* — Angelisa L. Hicks
(74) *Attorney, Agent, or Firm* — Osha Bergman Watanabe & Burton LLP

(57) ABSTRACT

A valve position sensing system includes a valve housing, a tail stock extending from the valve housing, an extendable valve stem extending axially through the tail stock, and a valve sensor housing assembly. The valve sensor housing assembly includes a housing body, having an interior cavity opening to a first and a second end, where the first end has a fixed connection portion integrally formed with the housing body and a movable connection portion that is movable relative to the fixed connection portion. The fixed and movable connection portions are fitted around the tail stock to secure the first end of the housing body to the tail stock. The valve sensor housing assembly further includes a closure mechanism disposed around the first end, a backplate covering the opening of the interior cavity at the second end, and a sensor provided in the interior cavity.

12 Claims, 11 Drawing Sheets

VALVE POSITION SENSOR

BACKGROUND

In the oil and gas industry, valve trees 102 are commonly used to cap production wells, as shown in FIG. 1. For example, a valve tree 102 may be positioned such that it can receive production fluids transported up a wellbore 104 from a formation beneath the surface 106. A valve tree 102 may include one or more linearly acting valves 108 connected to a central body 110. The linearly acting valves 108 control production of production fluids. Linearly acting valves 108 may include, for example, gate valves.

In the oil and gas industry, sensors are often attached to gate valves, which may be present on valve trees 102. Sensors are often utilized on multiple jobs in succession. During rig-up (i.e., set-up of the valve tree 102), rig-down (i.e., tear down of the valve tree 102), and transportation operations, sensors may be damaged such that they cannot be utilized again.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a valve position sensing system. The valve position sensing system may include a valve housing, a tail stock extending from the valve housing, an extendable valve stem extending axially through a tail stock cavity centrally located in the tail stock, and a valve sensor housing assembly. The valve sensor housing assembly may include a housing body, having an interior cavity opening to a first end and a second end, where the first end comprises a fixed connection portion integrally formed with the housing body and a movable connection portion that is movable relative to the fixed connection portion. The fixed connection portion and the movable connection portion may be fitted around the tail stock to secure the first end of the housing body to the tail stock. The valve sensor housing assembly may further include a closure mechanism disposed around the first end of the housing body, a backplate covering the opening of the interior cavity at the second end of the housing body, and a sensor provided in the interior cavity.

In another aspect, embodiments disclosed herein relate to a valve sensor housing assembly. The valve sensor housing assembly may include a housing body, having an interior cavity opening to a first end and a second end, where the first end of the housing body comprises a fixed connection portion integrally formed with the housing body and a movable connection portion that is movable relative to the fixed connection portion. The valve sensor housing assembly may also include a ratcheting closure mechanism disposed around the first end of the housing body, and a backplate covering the opening of the interior cavity at the second end of the housing body, where the backplate is connected to the second end of the housing body by a slotted connection. The valve sensor housing assembly may further include a sensor provided in the interior cavity.

In yet another aspect, embodiments disclosed herein relate to a method of installing a valve sensor housing assembly. The method may include securing a first end of a housing body to a tail stock extending from a valve housing and positioning a valve position sensor within an interior cavity of the housing body through an opening in a second end of the housing body, the valve position sensor being operationally coupled to an extendable valve stem extending axially through the tail stock. The method may further include covering the opening in the second end of the housing body.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7, any component described with regard to a figure, in various embodiments disclosed herein, may be equivalent to one or more like-named components described with regard to any other figure. For brevity, descriptions of these components may not be repeated for each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to a valve position sensing system, which may include a linearly acting valve and a housing body fitted around a tail stock of the linearly acting valve. More specifically, embodiments disclosed herein relate to a valve sensor housing assembly which may act as a protection apparatus for a sensor connected to a linearly acting valve.

Figure 1:
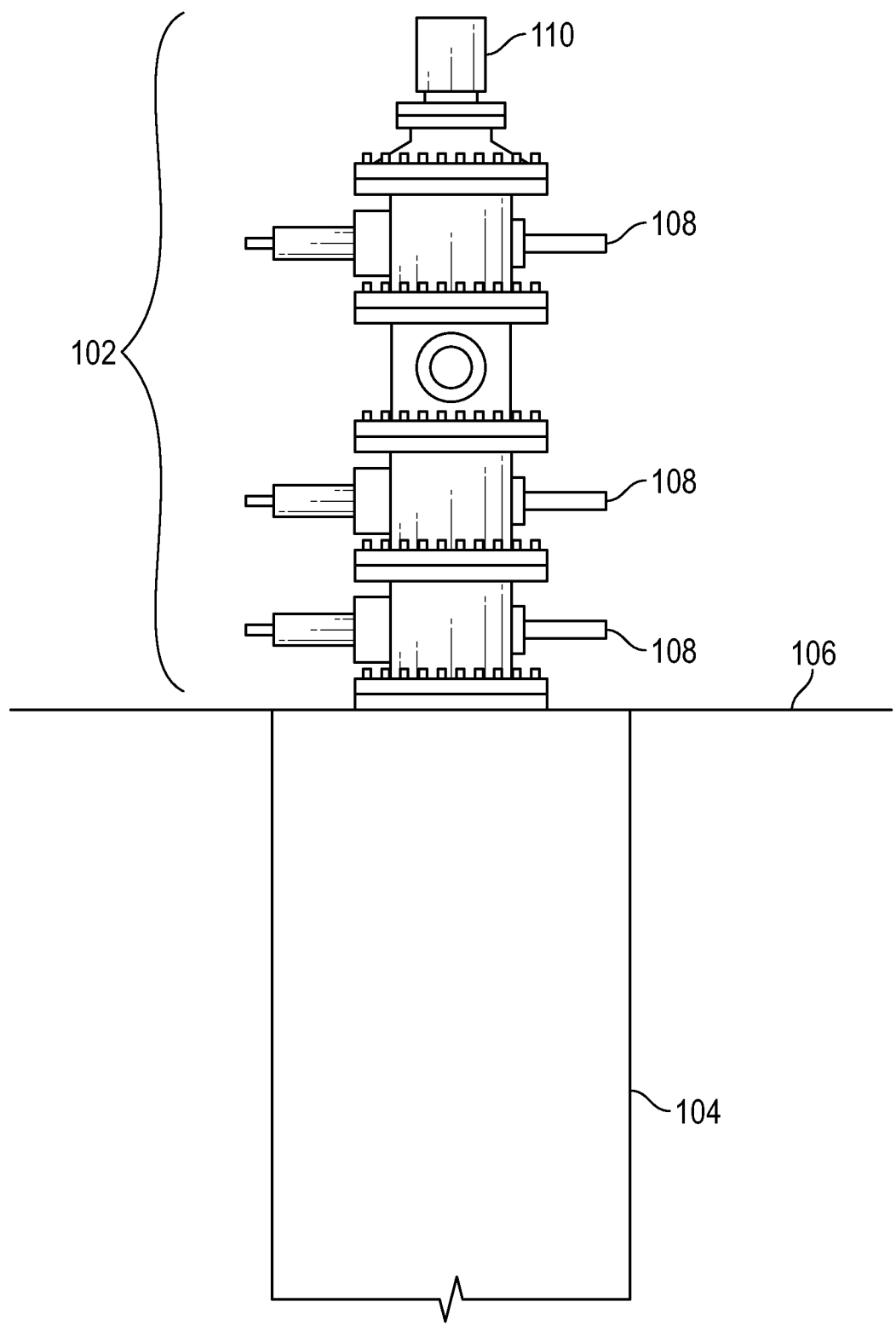
FIG. 1 depicts an exemplary wellhead assembly system.
Figure 2A:
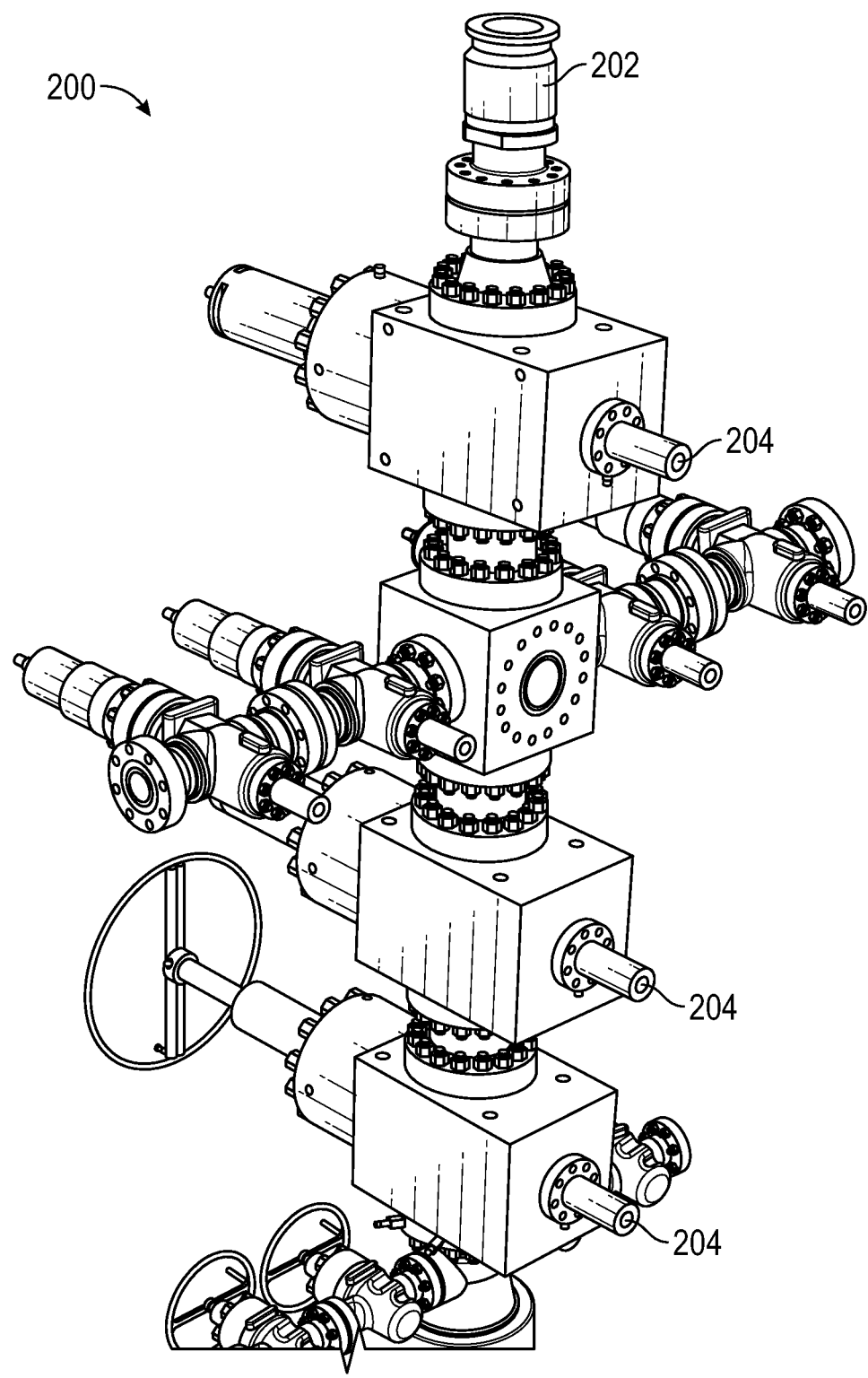
FIGS. 2A and 2B show a valve tree in accordance with one or more embodiments.
Figure 2B:
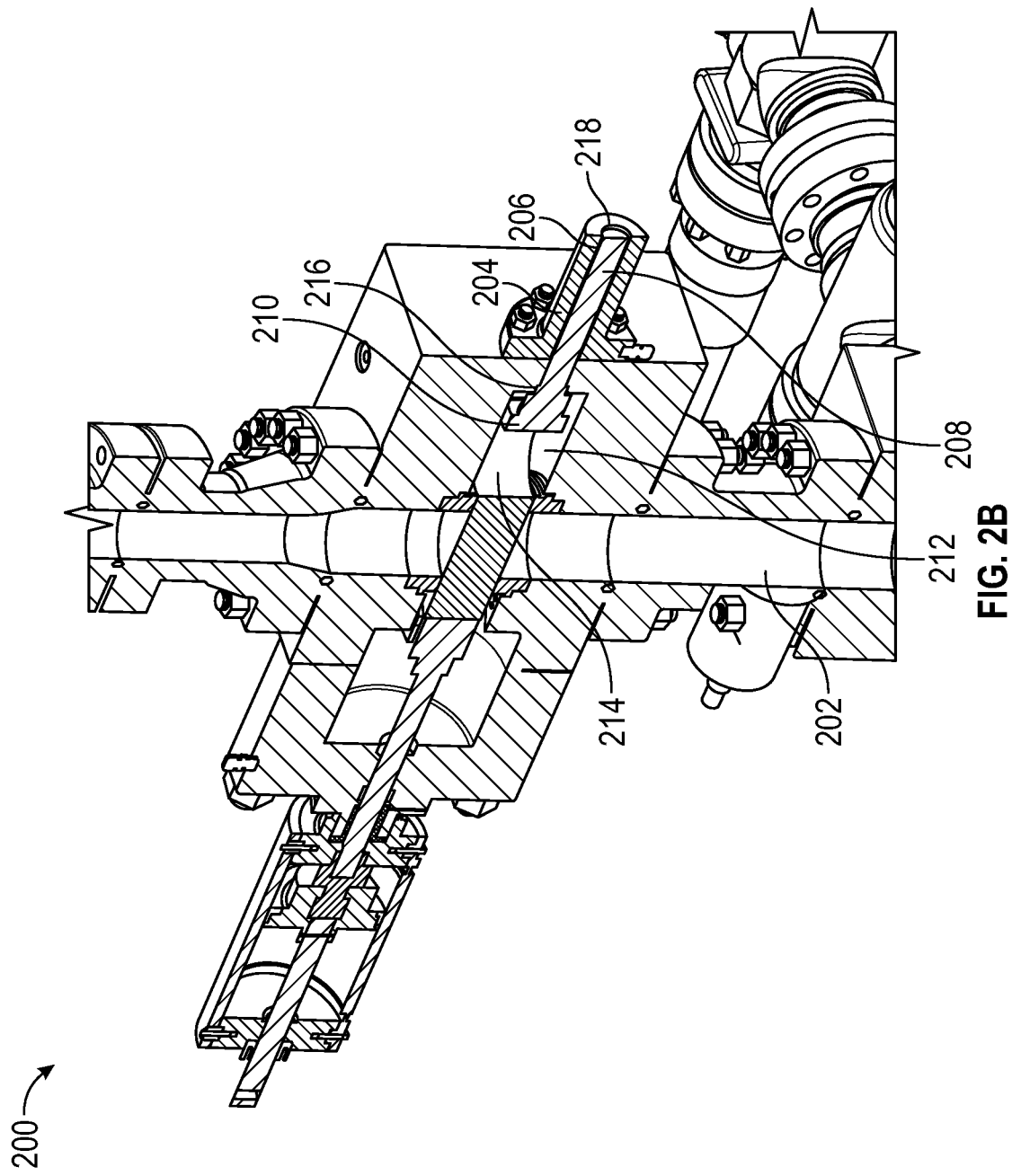

Turning now to FIGS. 2A and 2B, FIG. 2A shows a valve tree 200 in accordance with one or more embodiments, and FIG. 2B shows a cross-sectional view of the valve tree 200. Though there are many different types and configurations of valve trees, there may be one or more embodiments in which the valve tree 200 includes a valve housing 202 and one or more linearly acting valves, each having a tail stock 204 extending from the central body 202 in a single direction.

Each tail stock 204 may be a hollow tubular, where a tail stock cavity 206 is located within the hollow center of the tail stock 204. An extendable stem 208 of the linearly acting valve may extend axially through the tail stock cavity 206. A first end of the extendable stem 208 may be integrally connected to a stem head 210, which may be disposed in a valve cavity 212, and a second end of the extendable stem 208 may be positioned within the tail stock cavity 206. In one or more embodiments, the extendable stem 208 may move through the tail stock cavity 206 from a retracted position (where the extendable stem 208 is retracted to its maximum extent within the valve cavity 212 and tail stock cavity 206) to an extended position (where the extendable stem 208 is moved in the opposite direction from the retracted position to its maximum extent to have the extendable stem 208 extending outwardly from the tail stock cavity 206).

In one or more embodiments, a retracted position may refer to a position where the stem head 210 is flush with a first side 214 of the valve cavity 212, and the second end of the extendable stem 208 is within the tail stock cavity 206. In one or more embodiments, an extended position may refer to a position in which the stem head 210 is flush with a second side 216 of the valve cavity 212, and the second end of the extendable stem 208 is flush with the exterior outlet 218 of the tail stock 204.

Figure 3A:
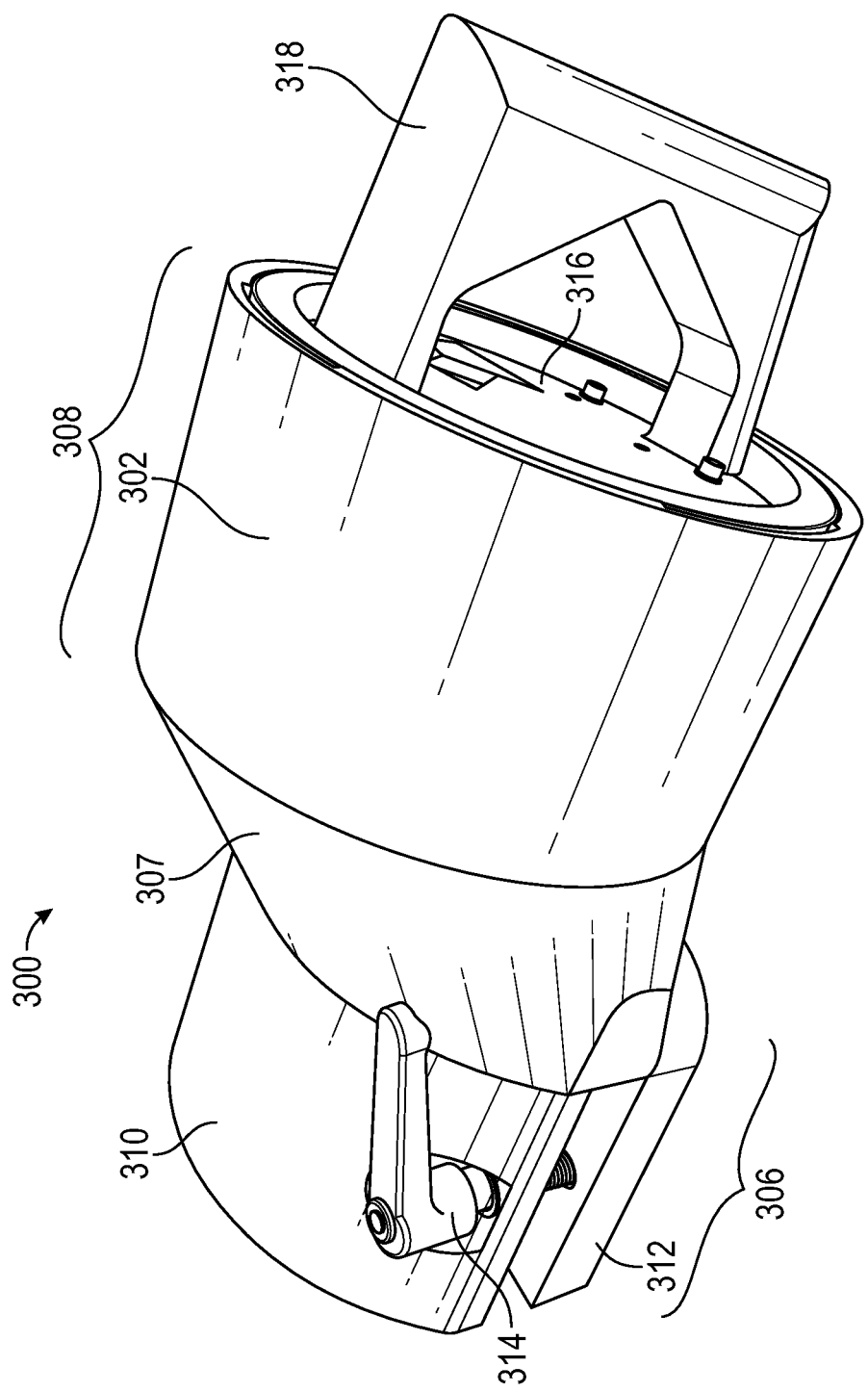
FIGS. 3A and 3B shows a valve sensor housing assembly in accordance with one or more embodiments.
Figure 3B:
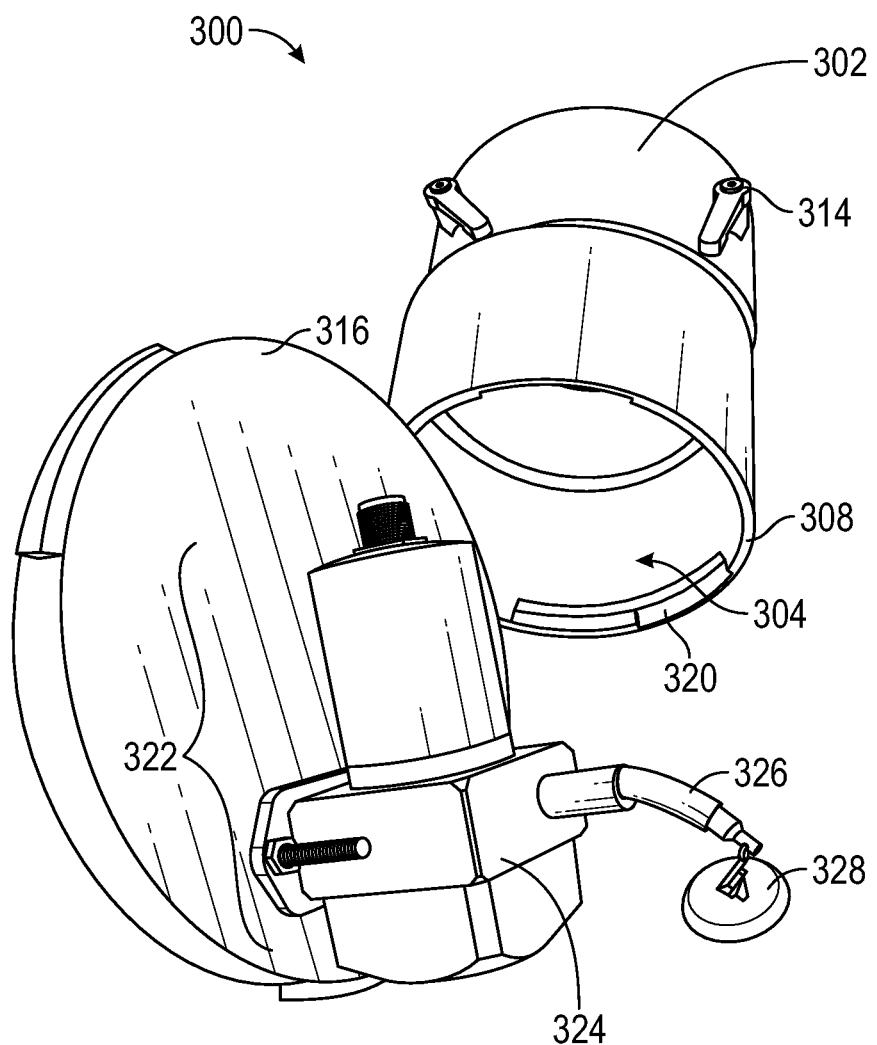

Turning now to FIGS. 3A and 3B, FIG. 3A shows a side view of a valve sensor housing assembly in accordance with one or more embodiments, and FIG. 3B shows the valve sensor housing assembly in an open configuration. The valve sensor housing assembly 300 may have a hollow housing body 302 through which an interior cavity 304 may extend. In one or more embodiments, the housing body 302 may be produced via three-dimensional printing and may be composed of a polymer material. However, there may also be various other manufacturing methods and materials that may be used without departing from the scope of this disclosure.

The housing body 302 may have a first end 306 and a second end 308 disposed at opposite axial ends of the housing body 302. A step feature 307 may connect the first and second ends 306, 308, such that the first and second ends 306, 308 are axially offset. The first end 306 and the second end 308 may have generally cylindrical outer profiles. In some embodiments, a housing body may have coaxially aligned first and second ends, where the second end may have a larger outer diameter than the first end. In one or more embodiments, the housing body 302 and interior cavity 304 may have generally cylindrical profiles. However, there may be other embodiments in which the housing body 302 or the interior cavity 304 or both have alternate geometry. For example, a housing body 302 may have a second end with at least one planar side (e.g., a polygonal inner and/or outer profile). In such embodiments, a sensor (discussed more below) may be mounted to a planar inner side surface of the second end of the housing body.

The first end 306 may include a fixed connection portion 310, which may be integrally formed with the housing body 302. The first end 306 may also include a movable connection portion 312. In some embodiments, the movable connection portion 312 may be a separate and removable component from the fixed connection portion 310. The fixed connection portion 310 and movable connection portion 312 may be connected by a ratcheting closure mechanism 314, configured to either move together or move apart the fixed and movable connection portions 310, 312 depending on situational needs. In some embodiments, a movable connection portion 312 may be connected to but movable with respect to the fixed connection portion 310 via other mechanisms, such as a hinge, adjustable tie-down straps or belts extending around the outer surfaces of the fixed and movable connection portions, clamps, or other adjustable connection mechanism. In some embodiments a housing body 302 may have a generally cylindrical second end 308 and elliptically shaped first end 306. In such embodiments, the wider portions of the first end 306 may have closure mechanisms 314 fitted therethrough, where the extra material at the wider portions of the first end may help provide support and strength to the closure mechanisms.

The second end 308 may include a removable backplate 316. The removable backplate 316 may connect via a slotted connection to the second end 308 (e.g., with interlocking slot and extension features formed on the backplate and second end). However, the backplate 316 may also be connected to the second end 308 using another type of locking mechanism, such as a threaded connection or latches. In one or more embodiments, the backplate 316 may include a handle 318 for ease of handling the backplate 316 as it is secured to the housing body 302, e.g., for completing the slotted connection 320 between the backplate 316 and the second end 308. In one or more embodiments, the backplate 316 and handle 318 may be manufactured in the same manner and from the same material as the housing body 302. For example, there may be embodiments in which the backplate 316 and the handle 318 are 3D printed from the same polymer as the housing body 302. In one or more embodiments, a sensor 322 may be mounted to an interior surface of the backplate 316. In some embodiments, the sensor 322 may be mounted via a bolt connection, as shown in FIG. 3B. However, the sensor 322 may be mounted to the backplate 316 in any manner, without departing from the scope of this disclosure (e.g., using a bracket or other support structure).

In one or more embodiments, the sensor 322 may include a sensor body 324 mounted to the interior surface of the backplate 316. A retractable connection line 326 may extend from the sensor body 324, and a magnet 328 may be disposed at the end of the retractable connection line 326.

Figure 4A:
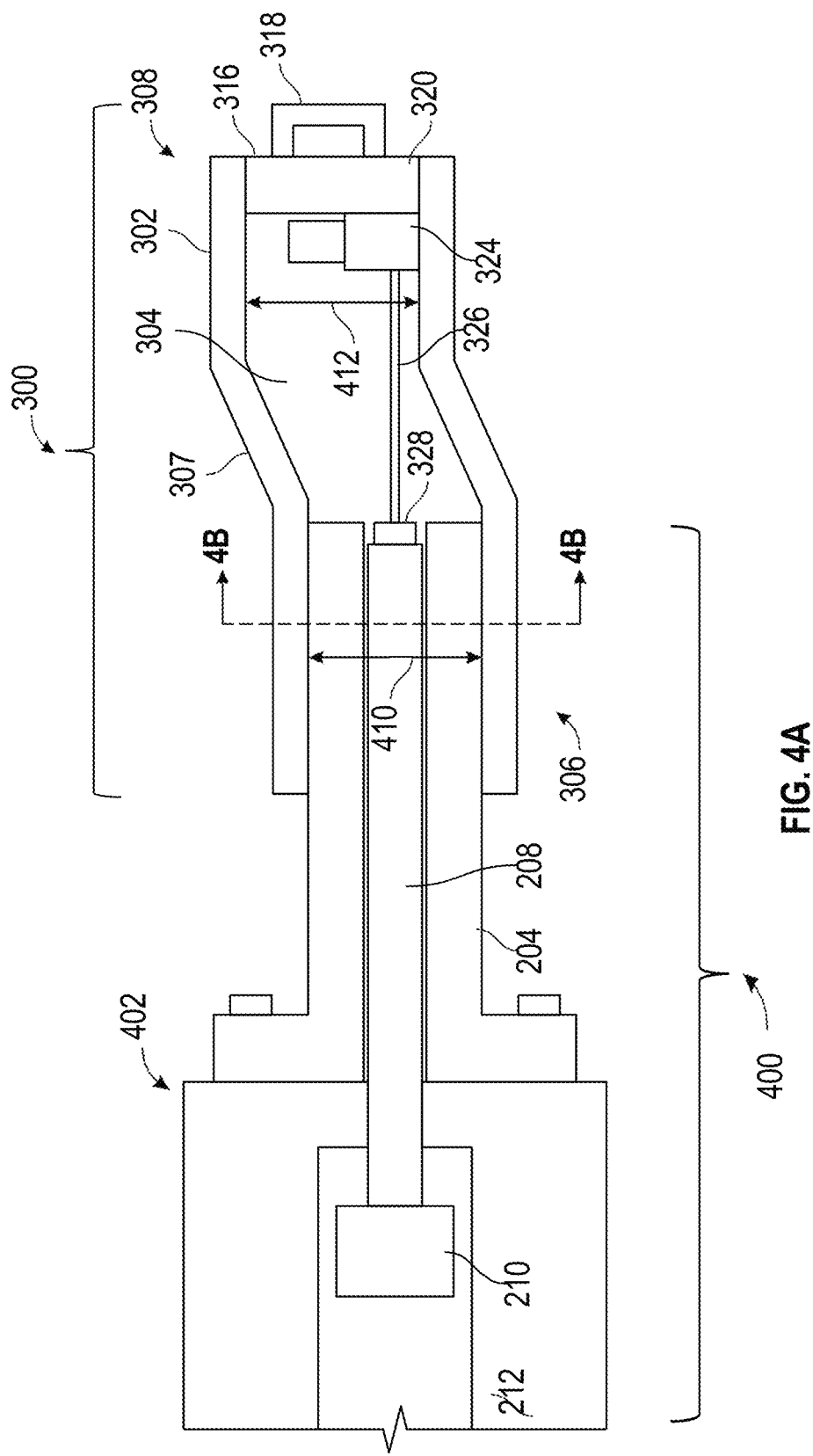
FIGS. 4A and 4B shows a valve position sensing system in accordance with one or more embodiments.

Turning now to FIG. 4A, FIG. 4A shows a cross-sectional view of a valve position sensing system 400 in accordance with one or more embodiments. In one or more embodiments, the valve position sensing system may include a valve sensor housing assembly 300 mounted on a linearly acting valve 402. A portion of the valve sensor housing assembly 300 may fit around the tail stock 204 of the linearly acting valve 402 such that the tail stock 204 is disposed within a portion of the interior cavity 304 of the housing body 302.

In one or more embodiments, the magnet 328 may attach to an end of the extendable stem 208, such that when the extendable stem 208 moves from the extended position to the retracted position, the magnet 328 may move with the extendable stem 208, extending the retractable connection line 326. In one or more embodiments, the retractable connection line 326 may be spring-loaded.

In one or more embodiments, the sensor 322 may identify the position of the tail stock 204 within the tail stock cavity 206. In one or more embodiments, the sensor 322 may be a draw wire potentiometer. However, there are other embodiments in which a different type of sensor 322 may be used. Once the sensor 322 is installed, there may be no need for local calibration, with the sensor 322 being calibrated by a corresponding software.

In the embodiment shown in FIG. 4A, the housing body 302 may have a second end 308 that is offset from the first end 306. In some embodiments, a housing body 302 may have a second end 308 that is sized or shaped differently from the first end 306 and that may or may not be axially offset from the first end 306. In embodiments where the housing body 302 second end 308 is sized or shaped differently from the first end 306 and/or axially offset from the first end 306, the housing body 302 configuration and sensor location within the housing body may be designed such that the retractable connection line 326 does not contact an interior surface of the housing body 302 during operation. For example, a sensor 322 may be positioned in the interior cavity 304 of the housing body 302 such that an open path for the retractable connection line 326 is provided between the sensor body 324 and the outlet 218 of the tail stock 204 through the interior cavity 304, without interference from an interior surface of the housing body 302.

Figure 7:
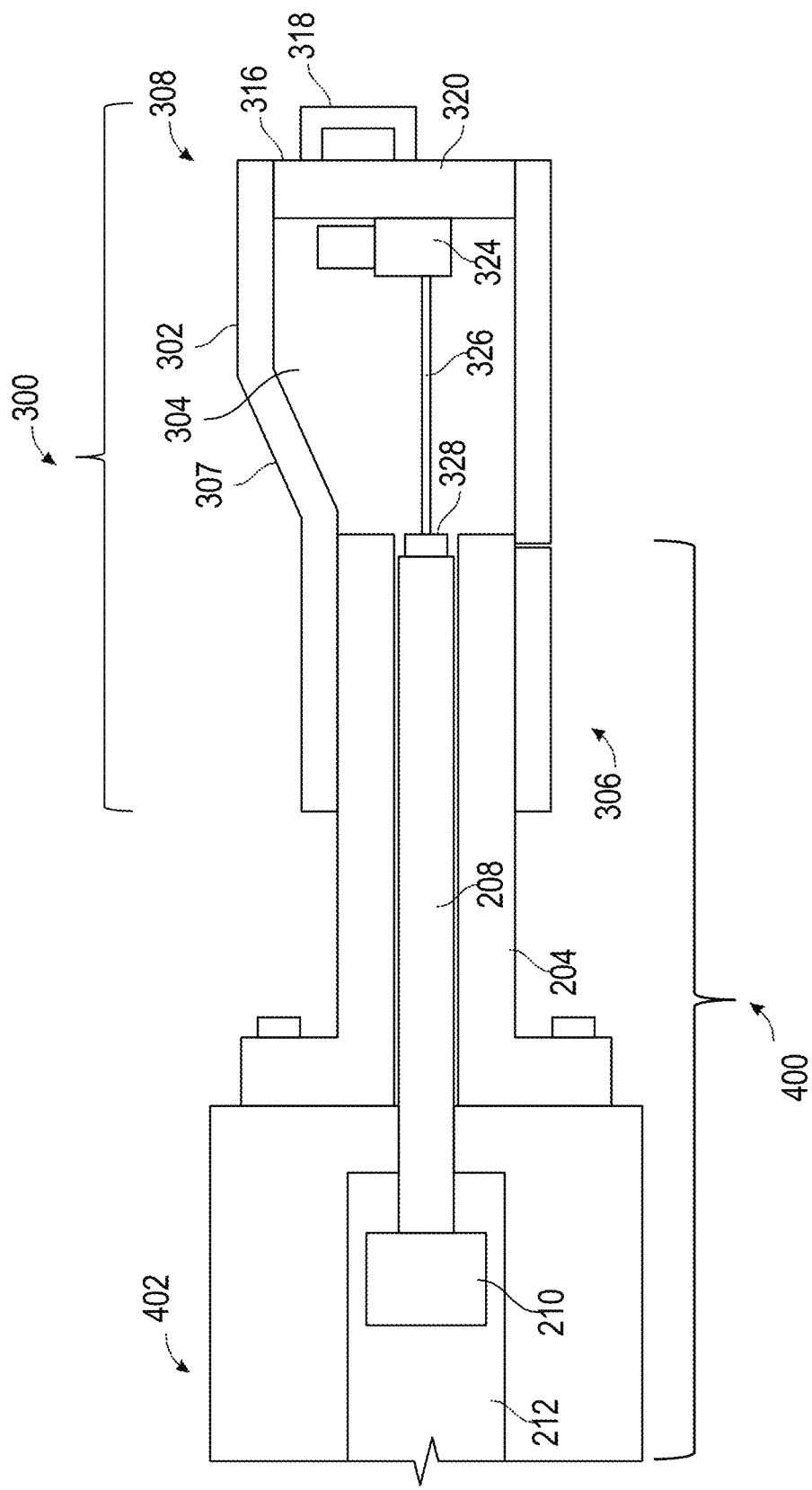
FIG. 7 shows a valve position sensing system in accordance with one or more embodiments of the present disclosure.

For example, FIG. 7 shows an alternative housing body design having a first end 306 with a smaller inner and outer diameter than a second end 308. In the embodiment shown, a step feature 307 may be provided on only one side of the housing body 302. The first and second ends 306, 308 may axially overlap such that a retractable connection line 326 may be extended from a sensor body 324 through the interior cavity 304 of the housing body 302 to the valve stem 208 without contacting any interior surface of the housing body 302.

Referring again to FIG. 4A, the housing body 302 may have a first inner diameter 410 and a second inner diameter 412, where the first inner diameter 410 is measured at the first end 306 and the second inner diameter is measured at the second end 308 (as shown in FIG. 3A, for example). In one or more embodiments, the second inner diameter 412 may be larger than the first inner diameter 410. However, there may also be embodiments in which the first inner diameter 410 is larger than the second inner diameter 412, particularly if the tail stock 204 is large.

Figure 4B:
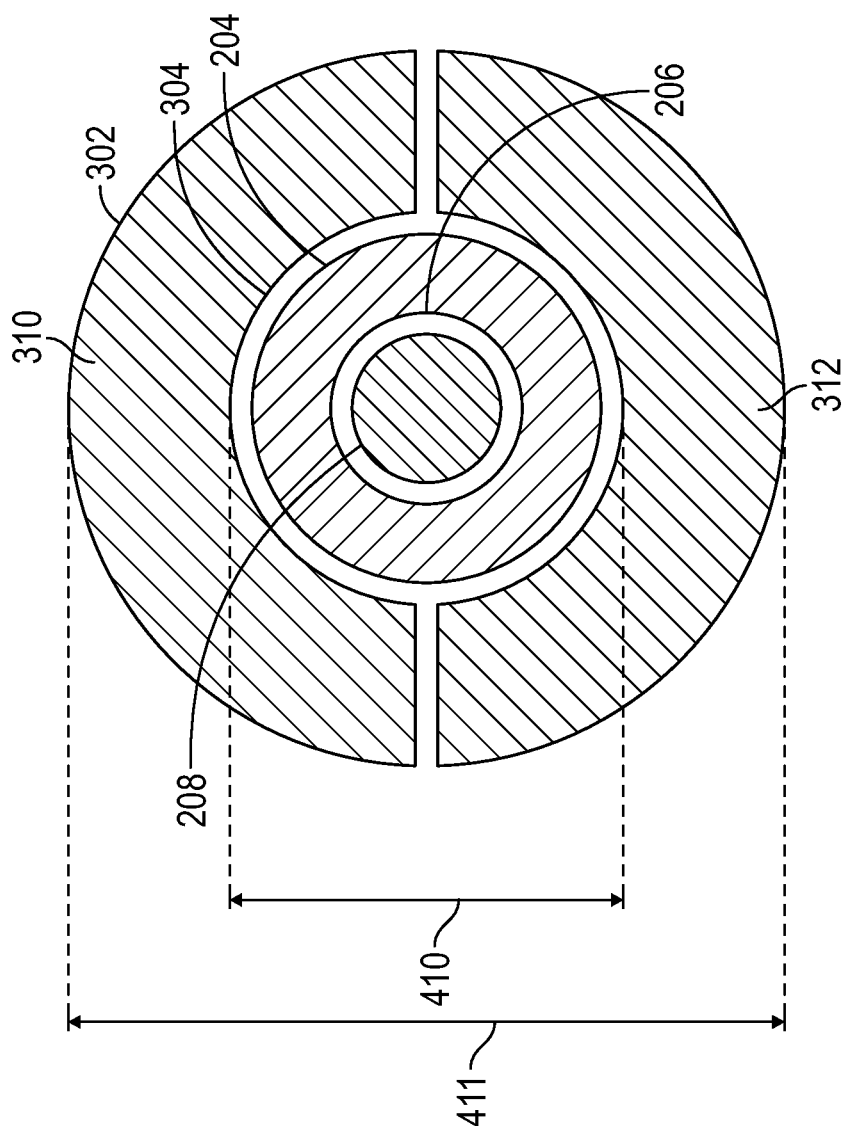

FIG. 4B shows a radial cross-sectional view of the valve position sensing system 400 along cross-section 4B shown in FIG. 4A. As can be seen from FIG. 4B, when the first end 306 of the housing body 302 is fitted around a tail stock 204, the first end 306 may have a first inner diameter 410 formed between the inner surfaces of the fixed and movable connection portions 310, 312 of the housing body 302 and a first outer diameter 411 formed between the outer surfaces of the fixed and movable connection portions 310, 312 of the housing body 302. The tail stock 204 may fit snugly inside the first inner diameter 410 of the housing body 302. The housing body 302 may be further secured to the tail stock 204 using the ratcheting closure mechanism 314 (not pictured) to tighten the movable connection portion 312 closer to the fixed connection portion 310, thereby tightening the first end 306 around the tail stock 204. In one or more embodiments, tightening or loosening the ratcheting closure mechanism 314 may change the first diameter 410.

Figure 5B:
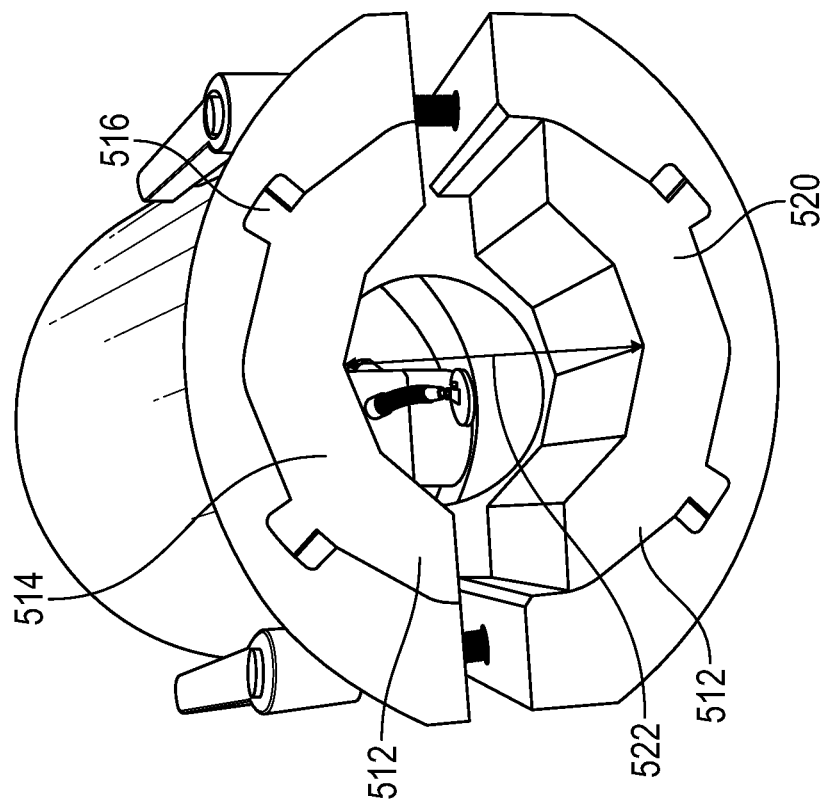
FIGS. 5A-5D show a valve sensor housing assembly in accordance with one or more embodiments.
Figure 5A:
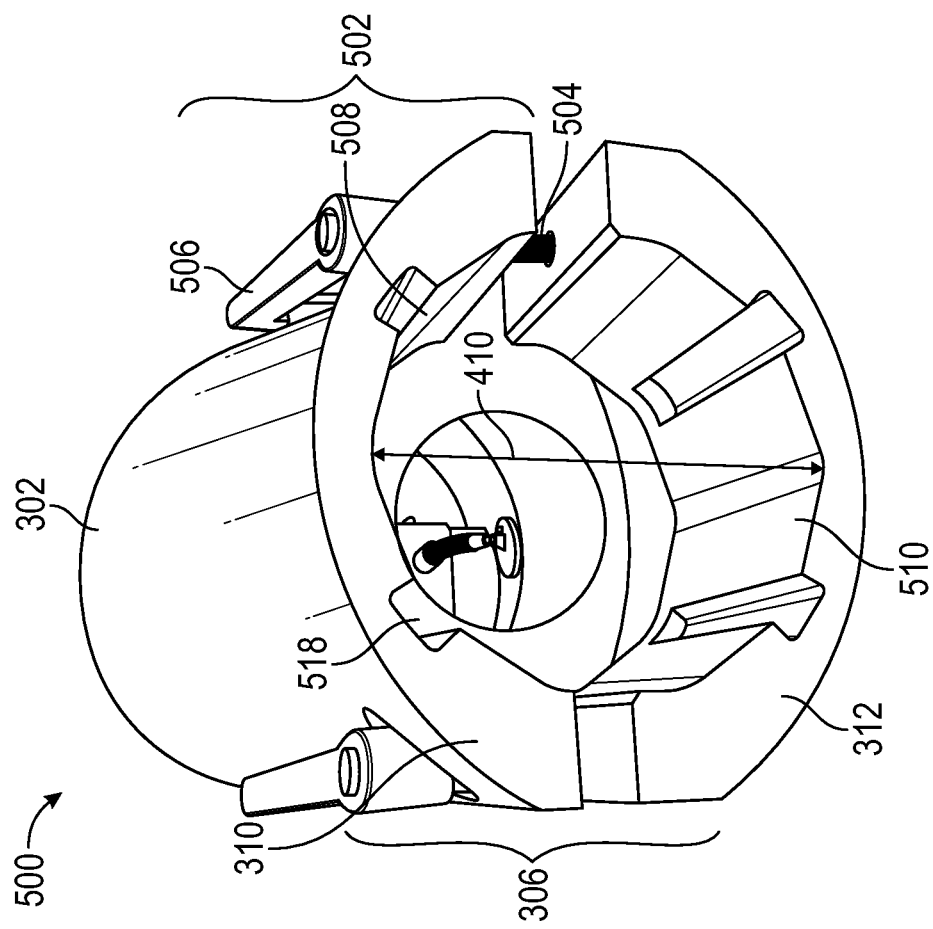

Turning now to FIGS. 5A and 5B, FIGS. 5A and 5B show a valve sensor housing assembly 500 in accordance with one or more embodiments. More specifically, FIG. 5A shows the valve sensor housing assembly 500 without a removable spacer 512 in its first end 306 to provide a relatively larger first inner diameter, and FIG. 5B shows the valve sensor housing assembly 500 with a removable spacer 512 in its first end to provide a relatively smaller first inner diameter. The first inner diameter of the first end 306 may further by increased or decreased using a ratcheting closure mechanism 314.

In one or more embodiments, the ratcheting closure mechanism 314 may include two or more securing components 502 (e.g. a bolt). Each securing component 502 may include a threaded post 504, which may extend through each of the fixed connection portion 310 and the movable connection portion 312. In one or more embodiments, the threaded post 504 may extend axially through and threadably connect to a first hole (not pictured) in the fixed connection portion 310 and a second hole (not pictured) in the movable connection portion 312.

The securing component 502 may also include a head, e.g., a ratchet handle 506, which may be used to rotate the threaded post 504 to either tighten or loosen the securing component 502. In one or more embodiments, tightening the securing component 502 may reduce the first diameter 410. In the same manner, loosening the securing component 502 may increase the first diameter 410. In one or more embodiments, the ratchet handle 506 may be rotated in a number of 360-degree circles to tighten the securing component. However, there are other embodiments in which the ratchet handle 506 may have both a tighten configuration and a loosen configuration.

In tightening and loosening the securing components 502, the first end 306 may fit around a range of tail stocks 204, the largest of which may have a diameter approximately equal to the first inner diameter 410 when the securing component 502 is fully loosened, such that the first end 306 may fit around and be secured to the largest tail stock 204. In the same manner, the smallest tail stock 204 within the range may be approximately equal to the first diameter 410 when the securing component 502 is fully tightened, such that the first end 306 may fit around and be secured to the smallest tail stock 204. As used herein, "approximately" or like terms means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 5C:
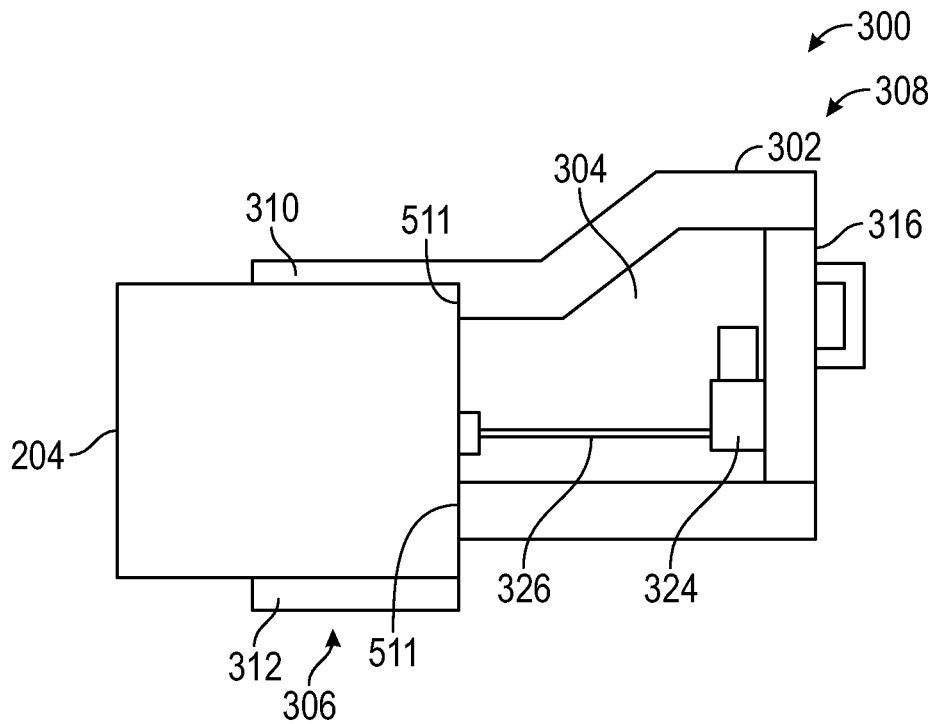

When installing the valve sensor housing assembly 500 around a tail stock 204, an operator may slide the tail stock 204 into the first end 306 of the housing body 302. For example, FIG. 5C shows a diagram of installation of the first end 306 of the valve sensor housing assembly 500 shown in FIG. 5A installed around a tail stock 204 of a valve. In some embodiments, when installing the first end 306 around the tail stock 204, the housing body 302 may be positioned around the tail stock 204 such that an interface wall 511 of the housing body 302 contacts a corresponding interface surface at an axial end of the tail stock 204. Additionally, the housing body 302 may be positioned around the tail stock 204 such that an interior surface of the fixed connection portion 310 of the housing body interfaces with an outer surface of the tail stock 204. The movable connection portion 312 may be assembled around the tail stock 204 such that an interior surface of the movable connection portion 312 interfaces with another portion of the tail stock outer surface, opposite the fixed connection portion 310. Once the fixed and movable connection portions are positioned around the tail stock 204, each securing component 502 may be tightened until an interior surface 508 of the fixed connection portion 310 and an interior surface 510 of the movable connection portion 312 are tightened around the exterior circumference of the tail stock 204 to hold the valve sensor housing assembly 500 on the tail stock 204.

In one or more embodiments, a tail stock 204 may have a diameter smaller than the first diameter 410 when the securing components 502 are fully tightened. As such, there are some embodiments where a removable spacer 512 may be installed in the first end 306 of the housing body 302, as shown in FIG. 5B. In one or more embodiments, the removable spacer 512 may be connected to the interior surfaces of the fixed and movable connection portions 310, 312.

The removable spacer 512 may include an upper block 514 installed in the fixed connection portion 310. In one or more embodiments, the upper block may include one or more interlocking features, such as extended features 516, sized to fit within one or more corresponding interlocking features, e.g., grooves 518, formed in the interior surface 508 of the fixed connection portion 310. The one or more extended features 516 and the one or more grooves 518 may be any size or shape without departing from the scope of this disclosure, though their relative sizes and shapes may be complementary. The upper block 514 may have an outer surface complementary in size and shape to the interior surface 508 of the fixed connection portion 310.

In the same manner, a lower block 520 may be installed in the movable connection portion 312. The lower block 520 may also include one or more interlocking features, e.g., extended features 516, which may correspond to one or more corresponding interlocking features, e.g., grooves, formed in the interior surface 510 of the movable connection portion 312. In one or more embodiments, the size and shape of the extended features 516 on the lower block 520 may be the same as those included on the upper block 514. However, there may also be embodiments in which the size and shape of the extended features 516 on the lower block 520 differ from those included on the upper block 514.

Figure 5D:
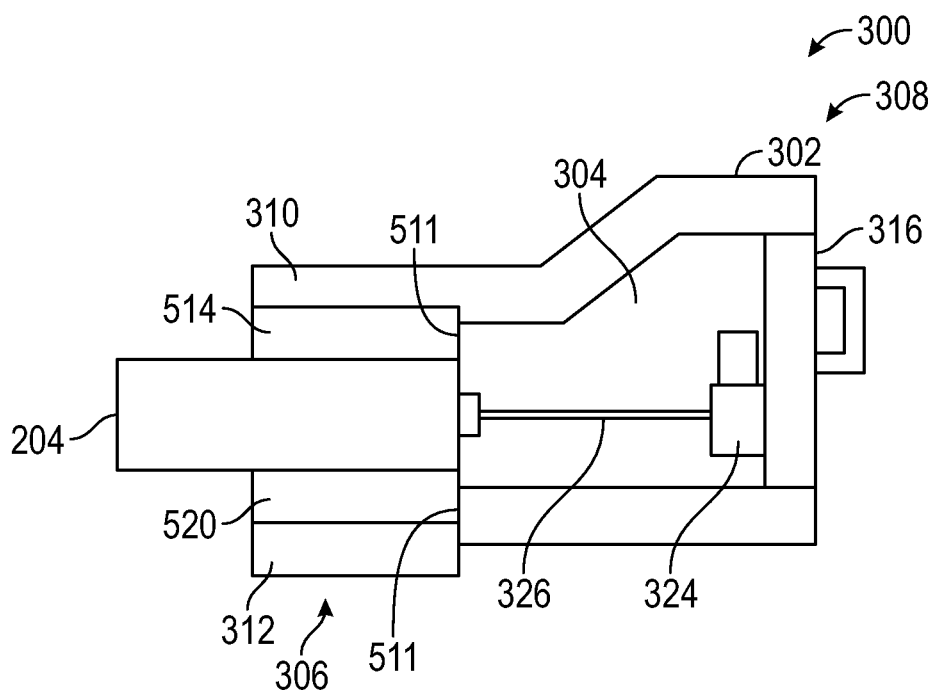

FIG. 5D shows a diagram of installation of the first end 306 of the valve sensor housing assembly 500 shown in FIG. 5B installed around a tail stock 204 of a valve. According to embodiments of the present disclosure, an upper block 514 and a lower block 520 may be installed within the first end 306 of the valve sensor housing assembly 500 prior to installing the first end 306 around a tail stock 204. Further, the upper and lower blocks 514, 520 may be installed within the first end 306 (e.g., using corresponding interlocking features between the spacers and the interior surface of the first end), such that upper and lower blocks 514, 520 are held in place (without falling out) while maneuvering the housing body 302. In some embodiments, when the upper and lower blocks 514, 520 are installed in the first end 306, the upper and lower blocks 514, 520 may contact the interface wall 511 of the housing body 302. Additionally, the housing body 302 may be positioned around the tail stock 204 such that an interior surface of the upper block 514 interfaces with an outer surface of the tail stock 204. The movable connection portion 312 and connected lower block 520 may be assembled around the tail stock 204 such that an interior surface of the lower block 520 interfaces with another portion of the tail stock outer surface, opposite the fixed connection portion 310. Once the fixed and movable connection portions are positioned around the tail stock 204, each securing component 502 may be tightened until the interior surfaces of the upper and lower blocks 514, 520 are tightened around the exterior circumference of the tail stock 204 to hold the valve sensor housing assembly 500 on the tail stock 204.

Though 'upper' and 'lower' are used to identify each block, it is understood that the valve sensor housing assembly 500 may be installed in any configuration and the upper and lower blocks 514, 520 may refer to any blocks installed in the fixed and movable connection portions 310, 312 which are positioned directly opposite each other.

Installing the upper block 514 and the lower block 520 may create a spacer diameter 522, which may refer to the distance between the respective midpoints of the interior surfaces of the upper block 514 and the lower block 520. Similar to the first diameter 410, the spacer diameter 522 may change depending on the relative tightness or looseness of the securing components 502. For example, the tighter the securing components 502, the smaller the spacer diameter 522, and vice versa.

In addition, installment of the upper and lower blocks 514, 520 may allow for linear alignment of the sensor body 324 and the extendable stem 208 (see FIG. 4A). Linear alignment of the sensor body 324 and the extendable stem 208 ensures that the retractable connection line 326 may be extended and retracted linearly, rather than an angle, which can reduce the life of the sensor and increase the likelihood of damage.

Figure 6A:
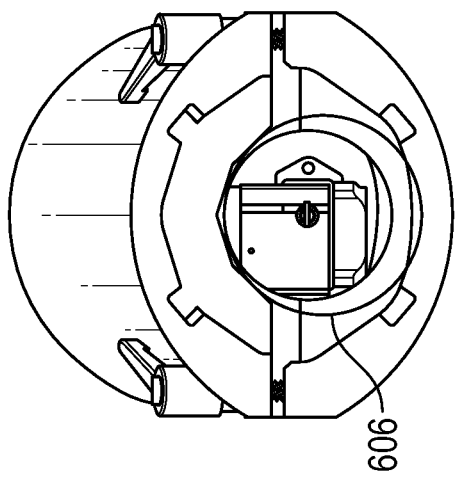
FIGS. 6A-6E show a valve position sensing system in accordance with one or more embodiments.

The removable spacer 512 may be installed in several configurations, as depicted in FIG. 6A-6E. In one or more embodiments, as shown in FIG. 6A, the first end 306 with the installed upper block 514 and lower block 520 may fit around a tail stock 602 when the securing component 502 is fully tightened. In one or more embodiments, 'fully tightened' may refer to a configuration where the fixed and movable connection portions 310, 312 are in contact with one another. In these embodiments, the outer diameter of the tail stock 602 may be, for example, 2.5 inches.

Figure 6B:
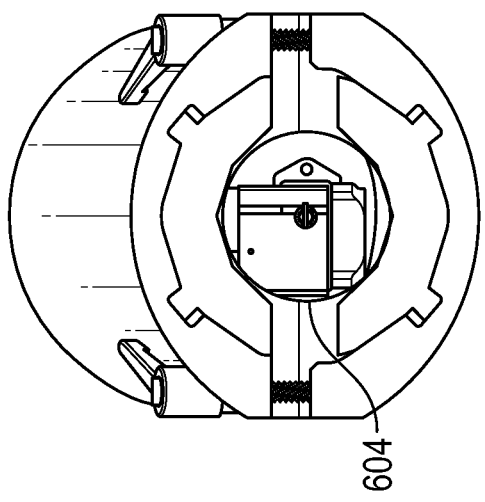

FIG. 6B shows the upper and lower blocks 514, 520 fitted around a tail stock 604, where the securing component 502 is in a loosened configuration. In one or more embodiments, a loosened configuration may be achieved when the fixed and movable connection portions 310, 312 are not in contact with one another, such that a gap exists between the two portions. In such embodiments, the tail stock 604 may have an outer diameter of, for example, 3 inches.

Figure 6C:
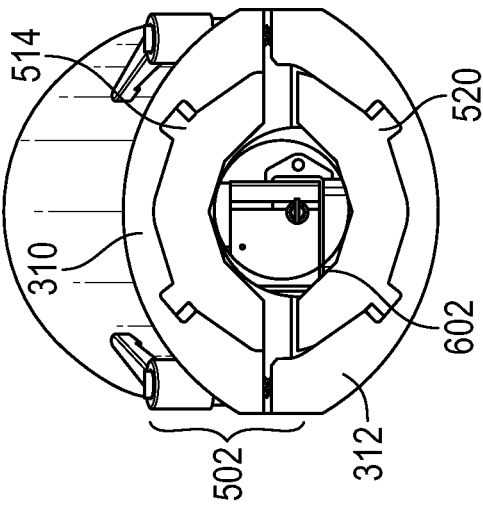

Moving now to FIG. 6C, some tail stocks 606 may have an outer diameter that is too large to fit between both the upper and lower blocks 514, 520. In such situations, it may be possible to install only one of the upper or lower blocks 514, 520. In FIG. 6C, only the upper block 514 is installed, however the same result may be achieved with installation of only the lower block 520. Further, FIG. 6C shows the securing component 502 in a fully tightened configuration. In the embodiments depicted in FIG. 6C, the outer diameter of the tail stock 606 may be, for example, 3.5 inches.

Figure 6D:
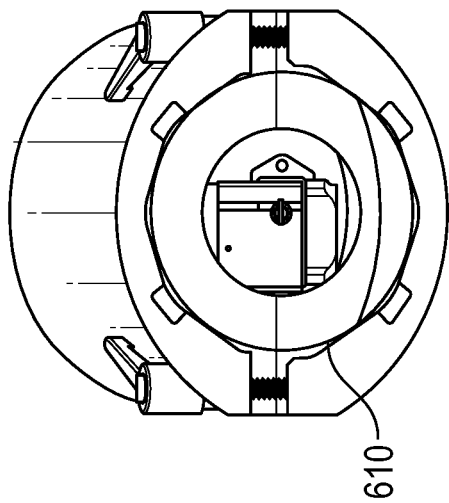
Figure 6E:
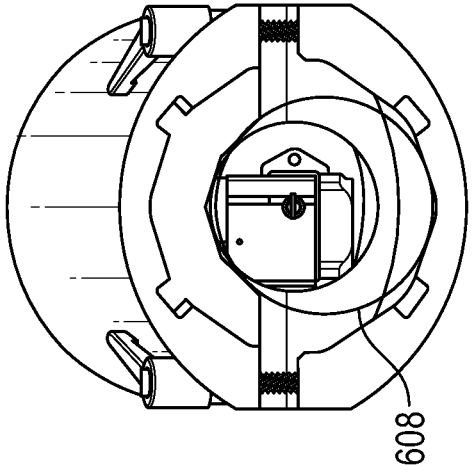

FIG. 6D depicts an embodiment in which only the upper block 514 is installed and in which the securing component 502 is in a fully loosened configuration. The outer diameter of the tail stock 608 may be, for example, 3.89 inches.

Some tail stocks 610 may be too large to use either an upper block 514 or a lower block 520. In these embodiments, the securing component 502 will be tightened until the interior surfaces 508, 510 of the fixed and movable connection portions 310, 312 are flush with the outer diameter of the tail stock 610. In one or more embodiments, the outer diameter of the tail stock 610 may be 5 inches.

Though the upper block 514 and the lower block 520 are shown as equal in size in FIGS. 6A-6E, there may be embodiments in which the blocks are different sizes. Further, there may be several upper blocks 514, each with different thicknesses, and several lower blocks 520, each with different thicknesses, to produce a plurality of spacer diameters 522. Variety in spacer diameter 522 may allow for a tighter and more accurate fit around tail stocks.

Embodiments of the present disclosure may provide at least one of the following advantages. Sensors, such as draw wire potentiometers, are often installed on linearly acting valves in order to detect and monitor the position of the extendable stem within the tail stock. However, these sensors, installed on the exterior of valve trees, are often left open to the elements, both during their service life on the valve tree and during rig-up and rig-down procedures. Exposure to the elements can shorten the lifespan of the sensor and can cause irreversible damage that requires sensor replacement. Embodiments of the present disclosure provide a sensor protection system in the form of a valve sensor housing assembly. The valve sensor housing assembly may be installed around a valve tail stock, fully enclosing the end of the tail stock and the sensor within its interior cavity. In this way, the sensor is protected from the elements and any rough handling during rig-up and rig-down procedures.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A valve position sensing system, comprising:
    a valve housing;
    a tail stock extending from the valve housing,
    an extendable valve stem extending axially through a tail stock cavity centrally located in the tail stock, and
    a valve sensor housing assembly, comprising:
        a housing body, having an interior cavity opening to a first end and a second end,
        wherein the first end of the housing body comprises a fixed connection portion integrally formed with the housing body and a movable connection portion that is movable relative to the fixed connection portion, and
        wherein a closure mechanism couples the fixed connection portion to the movable connection portion around the tail stock to secure the first end of the housing body to the tail stock,
        wherein the closure mechanism is disposed around the first end of the housing body;
        a backplate covering the opening of the interior cavity at the second end of the housing body; and
        a sensor provided in the interior cavity.

2. The valve position sensing system of claim 1, wherein the housing body comprises a step feature between the first end and the second end, such that the first end and the second end are axially offset.

3. The valve position sensing system of claim 1, wherein the sensor comprises:
    a sensor body mounted to an interior surface of the backplate;
    a retractable connection line extending from the sensor body; and
    a magnet fixed to an end of the retractable connection line.

4. The valve position sensing system of claim 3, wherein the magnet is connected to the extendable valve stem of the tail stock.

5. The valve position sensing system of claim 3, wherein the retractable connection line is spring-loaded.

6. The valve position sensing system of claim 1, wherein the housing body and the backplate comprise a polymer.

7. The valve position sensing system of claim 1, wherein the backplate is connected to the second end of the housing body by a slotted connection.

8. The valve position sensing system of claim 1, wherein the closure mechanism comprises:
    two securing components threadably connected to at least one of the fixed connection portion and the movable connection portion,
    wherein each of the securing components comprises a threaded post and a head secured to one end of the threaded post, and
    wherein each threaded post extends through and is threadably connected to a hole in the fixed connection portion and a hole in the movable connection portion.

9. The valve position sensing system of claim 1, wherein the fixed connection portion and the movable connection portion each have a removable spacer connected to an interior surface of the fixed connection portion and an interior surface of the movable connection portion.

10. The valve position sensing system of claim 9, wherein the removable spacer comprises an upper block configured to slide into the fixed connection portion and a lower block configured to slide into the movable connection portion.

11. The valve position sensing system of claim 9, further comprising a plurality of alternate removable spacers, where each of the plurality of alternate removable spacers is sized to fit around one of a plurality of tail stock diameters.

12. A method of installing a valve sensor housing assembly, comprising:
    securing a first end of a housing body to a tail stock extending from a valve housing,
    wherein securing the first end of the housing body comprises coupling a fixed connection portion integrally formed with the housing body to a movable connection portion of the housing body using a closure mechanism, wherein the movable connection portion is movable relative to the fixed connection portion;
    positioning a valve position sensor within an interior cavity of the housing body through an opening in a second end of the housing body, the valve position sensor being operationally coupled to an extendable valve stem extending axially through the tail stock; and covering the opening in the second end of the housing body.

* * * * *